March 19, 1968  C. A. TUCKER  3,373,505
ELECTRO-MECHANICAL FLIGHT SIMULATOR
Filed June 23, 1966  4 Sheets-Sheet 1
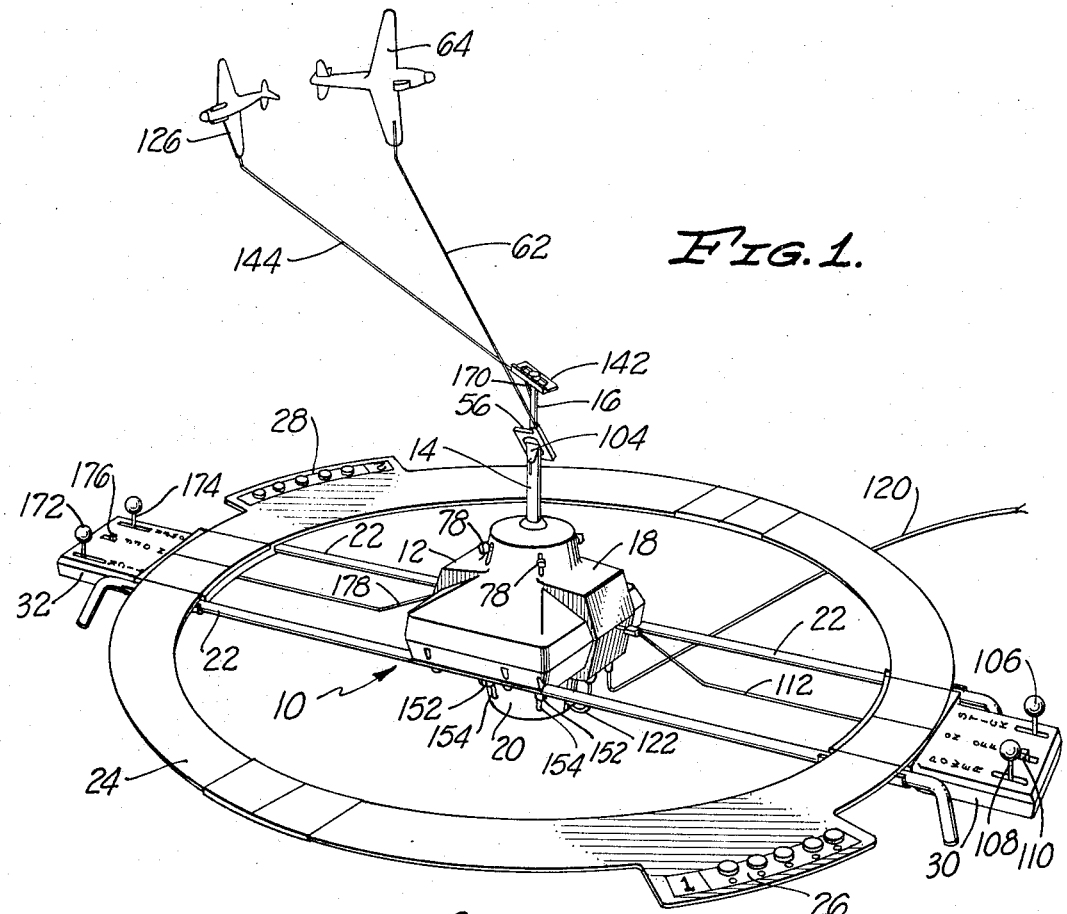
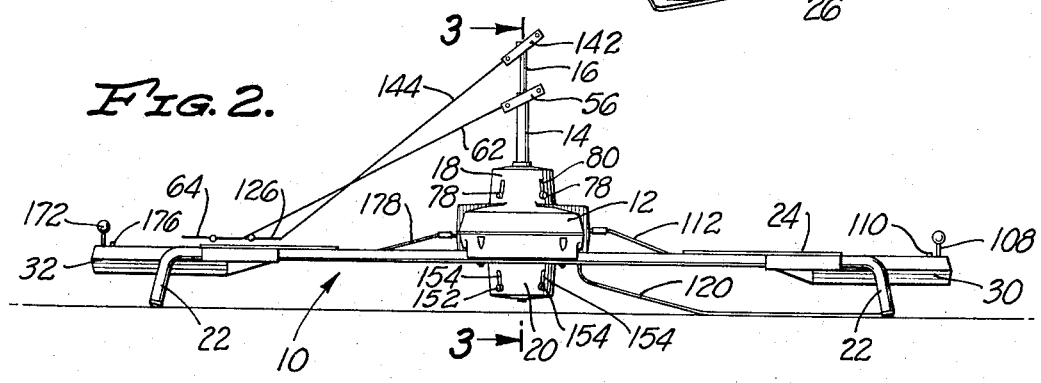
INVENTOR
COUNCIL A. TUCKER
BY
MAHONEY & HORNBAKER
ATTORNEYS

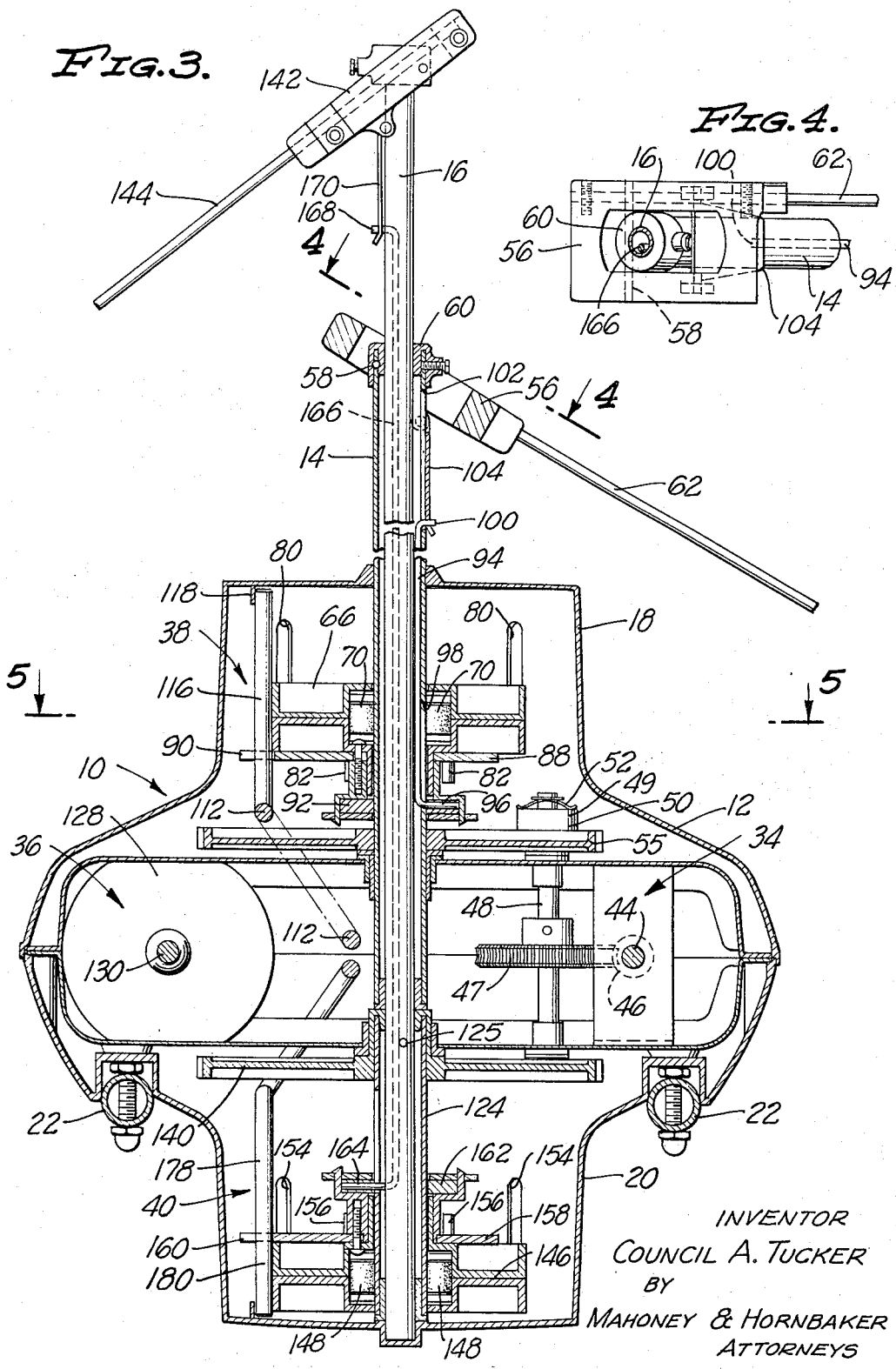

INVENTOR
COUNCIL A. TUCKER
BY
MAHONEY & HORNBAKER
ATTORNEYS

March 19, 1968  C. A. TUCKER  3,373,505
ELECTRO-MECHANICAL FLIGHT SIMULATOR
Filed June 23, 1966  4 Sheets-Sheet 4

INVENTOR
COUNCIL A. TUCKER
BY
MAHONEY & HORNBAKER
ATTORNEYS

United States Patent Office 3,373,505
Patented Mar. 19, 1968

3,373,505
ELECTRO-MECHANICAL FLIGHT SIMULATOR
Council A. Tucker, 3200 Buckingham Road,
Glendale, Calif. 91206
Filed June 23, 1966, Ser. No. 559,864
25 Claims. (Cl. 35—12)

ABSTRACT OF THE DISCLOSURE

A model aircraft is mounted spaced laterally from a vertical, rotatably driven shaft by a rigid connecting rod, said rod being rotatable with said shaft but vertically, angularly pivotal relative thereto. At least one roller rides against said shaft supported so that selective angular adjustment of the roller axis relative to the shaft axis causes the roller to move up and down or remain vertically stationary along the shaft from shaft rotation. A rigid connection between the roller and the rod translates roller vertical movement into rod and aircraft vertical movement. A second aircraft following the same flight path may be controlled by duplicate, identical mounting, the second drive shaft telescoped within the first extending above and below for the respective connecting rod and roller connections.

---

This invention relates to a flight simulator controlling movement of model aircraft which will closely simulate the characteristics of actual flight and flight control of actual aircraft and more particularly, to a flight simulator of this type which is particularly adapted for indoor use. Even more particularly, this invention relates to a flight simulator wherein two model aircraft may be independently controlled by separate operators to closely simulate actual flight patterns and maneuvers of actual aircraft in various forms of competitive combat or cooperation between the aircraft.

According to the present invention, the aircraft may be simultaneously rotated about a common vertical axis and may be selectively controlled at varying speeds of rotation simulating varying flight speeds and at varying vertical heights during this rotation simulating varying altitudes, the rate of altitude change being directly dependent on the combination of both speed of rotation and altitude adjustment, thereby closely simulating the maneuvering of actual aircraft. Furthermore, the control of the aircraft may be accomplished at locations remote from the aircraft movement through upright pivotal control levers so that not only are the operators provided with a full view from a stationary location of the maneuvering of the aircraft, but also the operators are provided with "joy stick feel" simulating that of actual small aircraft during such operation and control.

Various prior forms of remote control for model aircraft have been provided, probably the most popular of which is termed "U-control" for controlling gasoline powered model airplanes. In this form of control the airplane is connected to the operator by a tether which allows the airplane to fly in circles around the operator with the length of the control line or tether being the radius of the flight circle. Additionally, these model airplanes are provided with adjustable elevators for controllling the altitude of the airplanes during flight and lines controlling the adjustment of these elevators are connected to a control yoke held in the operator's hand so that by various movement of the yoke by the operator, the airplanes may be made to fly at variable and controllable heights with the limits of the tether maintaining the flight circle.

This "U-control" method of model aircraft control necessarily requires a relatively large space, such as an open field. Also, this form of control requires that the operator will rotate with the particular airplane as the airplane progresses around the flight circle. Thus, this "U-control" method is limited principally to outdoor use, confines the operator to the center of the airplane flight circle during operation thereof and for safe and practical operation, is limited to the control of one airplane at a given area of flight circle.

It is, therefore, an object of my invention to provide a flight simulator for model aircraft particularly adapted for indoor use, yet to provide the equivalent of "U-control," as well as advantages thereover. According to the present invention, one or several model aircraft constructed to simulate actual airplanes, space capsules or other types of aircraft, are rotated about a vertical axis at controlled, variable speeds through electric drive motors so as to provide the aircraft movable in flight circles. Also, altitude control for the aircraft is provided directly through the speed of rotation so that the rate of altitude change, and therefore flight maneuverability, is directly dependent on the combination of altitude adjustment and rotational speed so as to closely simulate the control of an actual aircraft.

It is another object of my invention to provide a flight simulator for model aircraft of the foregoing type wherein the speed and altitude control for the aircraft may be provided at a location remote from the flight circle. Also, such flight control may be provided through upright pivotal levers operable through remote control connections to the electric drive motors and the altitude controls. In this manner, the operator or operators are positioned at stationary locations remote from the flight circle for clear assessment of the controlled flight patterns and at the same time, are provided with a "joy stick feel" closely simulating that of actual small airplanes.

It is still a further object of my invention to provide a flight simulator for model aircraft of the foregoing type wherein two aircraft may be independently maneuvered by separate operators in the same flight circle making possible the adaption to a flight game testing the competitive skills of maneuverability by the operators. For instance, combat between the aircraft may be simulated with one aircraft pursuing the other and attempting to force the pursued aircraft down. Furthermore, in-flight refueling may be simulated, as well as various space rendezvous and air circus maneuvers, common to various actual aircraft under actual flight conditions.

Other objects and advantages of the invention will be apparent from the following specification and the accompanying drawings which are for the purpose of illustration only, and in which:

FIG. 1 is a perspective view of an embodiment of the flight simulator of the present invention and showing two airplanes in flight;

FIG. 2 is a side elevational view of the flight simulator of FIG. 1 and showing the airplanes in landed position;

FIG. 3 is an enlarged, fragmentary, vertical, sectional view taken along the broken line 3—3 in FIG. 2;

FIG. 4 is a fragmentary, sectional view taken along the broken line 4—4 in FIG. 3;

Figure 5:
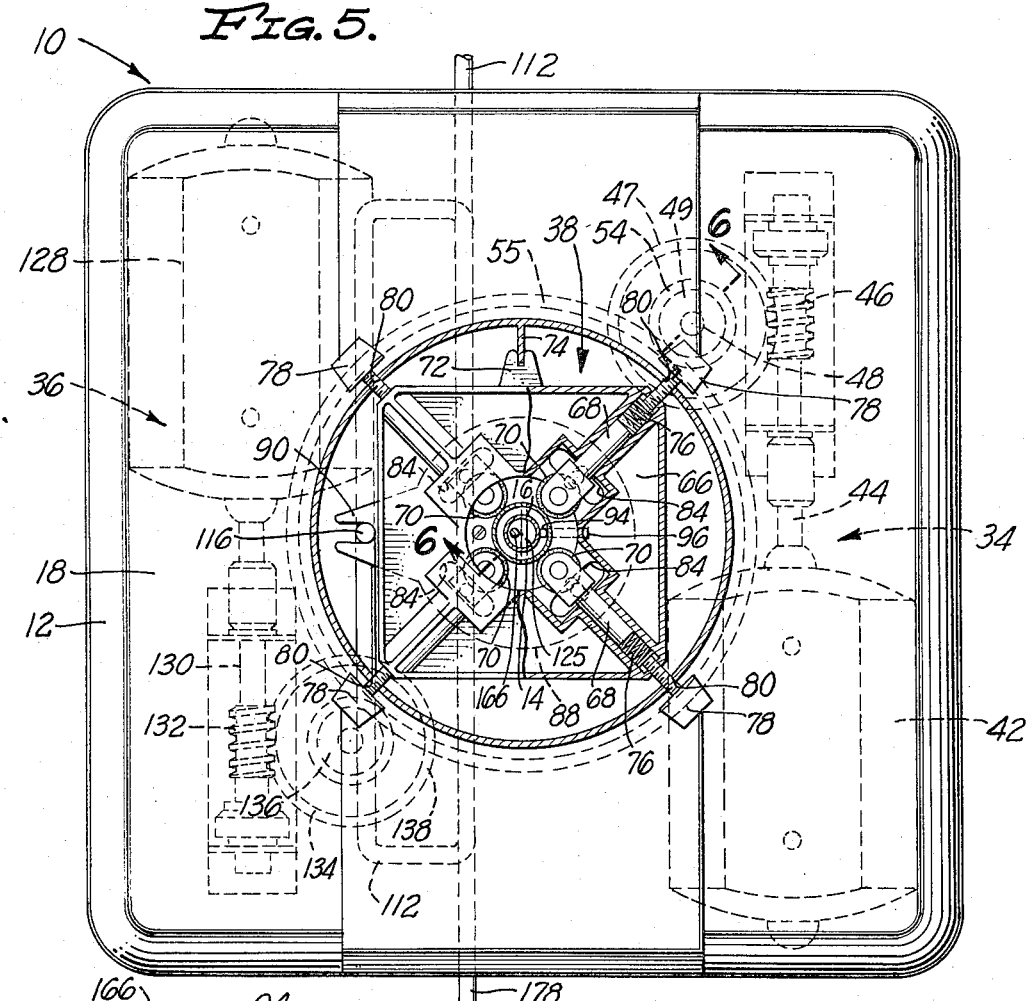
FIG. 5 is a fragmentary, horizontal, sectional view taken along the broken line 5—5 in FIG. 3.

In the following description of the embodiment of the flight simulator of the present invention, various common aircraft and space terms may be used, such as "flight," "flight patterns," "flight maneuvering," "space capsules," etc., but it should be kept in mind that these terms as used herein refer to simulated conditions simulating the actual conditions of actual aircraft. Also, though the embodiment of the present invention is illustrated and described herein for use with airplanes, it is not intended thereby to limit the principles of the present invention to airplanes alone, but rather the flight simulator of the present invention may be used with all forms of aircraft, whether airplanes, space capsules or otherwise. In addition, the flight simulator of the present invention may be formed of conventional materials and the aircraft may be actual scale models or otherwise, all of which are intended to be covered under the principles of the present invention.

Referring to FIG. 1, the embodiment of the flight simulator includes a frame generally indicated at 10 having a central drive and altitude control housing generally indicated at 12 which independently rotatably supports internested to telescoped, upright, outer or first shaft 14 and inner or second shaft 16, such rotatable mounting being shown in FIG. 3. As shown throughout the drawings, the embodiment of the flight simulator illustrated therein is constructed for simultaneous, although independent, rotation and control of two aircraft, such rotation being accomplished through first and second shafts 14 and 16, so that hereinafter the various components associated with the first shaft 14 will be referred to as "first" and the various components associated with the second shaft 16 will be referred to as "second." Furthermore, the various components associated with the first shaft 14 are constructed and operate in substantially the same manner as the components associated with the second shaft 16, merely being located in the housing 12 at different locations, so that the components associated with the first shaft 14 will be described in detail and the components associated with the second shaft 16 only referred to generally.

The housing 12 is formed by a cover 18 and base 20, with the base 20 being suported on legs 22. The legs 22 also support an annular landing strip 24 having first and second scoreboards 26 and 28, and first and second remote control panels 30 and 32, the latter control panels being described hereinafter more in detail. The housing 12 encloses first and second drive assemblies 34 and 36 intermediate the vertical height thereof and first altitude control mechanism 38 within the cover 18 and second altitude control mechanism 40 within the base 20, all as shown in FIG. 3.

Referring particularly to FIGS. 3 through 8, the first drive assembly 34 includes a variable speed, electric, first drive motor 42 having a shaft 44 operably connected through a worm 46 and a worm gear 47 through an idler shaft 48 to a ratchet clutch 49, which clutch in turn mounts a driving gear 54 engaged with a driven gear 55. The driven gear 55 is secured telescoped over and surrounding the first shaft 14 below the first altitude control mechanism 38 so that actuation of the first drive motor 42 will result in a reduced speed rotation of the first shaft 14, and the rotational speed of the first shaft 14 may be selectively varied by varying the speed of the first drive motor 42.

Figure 6:
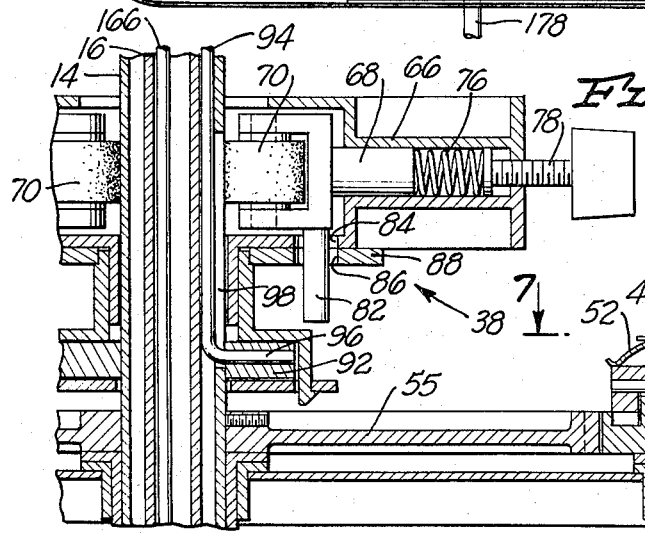
FIG. 6 is an enlarged, fragmentary, vertical, sectional view taken along the broken line 6—6 in FIG. 5.
Figure 7:
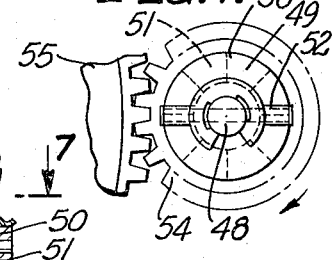
FIG. 7 is an enlarged, fragmentary, horizontal, sectional view taken along the broken line 7—7 in FIG. 6.

The clutch 49, as best seen in FIGS. 6 and 7, is of an overriding ratchet type having a driving member 50 with driving teeth 51 normally urged into driving engagement by a leaf spring 52 with driven ratchet teeth 53 on the driving gear 54, as long as an outside force does not urge the rotational speed of the gear 54 to exceed that of the clutch driving member 50, at which time, the ratchet teeth 51 and 53 will disengage by member 50 being forced upwardly. Thus, the clutch 49 will normally transmit rotational motion therethrough rotating first shaft 14 at a speed proportionate to the speed of first drive motor 42, dependent on the particular gearing therebetween, but permitting, through the overriding ratchet feature thereof, the forced rotation of first shaft 14 at a speed faster than this normally driven speed, while preventing overdriving of the first drive motor 42, which could result in serious damage thereto.

A pivotal support plate 56 is telescoped over the upper end of first shaft 14, being vertically pivotally connected thereto for rotation therewith through a pivot pin 58 and a collar 60. The inner end of a radially extending, rigid connecting rod 62 is secured to the support plate 56, with an outer end of connecting rod 62 being secured to a first airplane 64. It will be noted that the length of the connecting rod 62 is such as to position the first airplane 64 overlying the landing strip 24 so that downward pivoting of the support plate 56 and the connecting rod 62 will position the first airplane 64 resting on the landing strip 24 (FIG. 2).

The first control mechanism 38 is formed by an elevating control housing 66 which adjustably supports equally circumferentially spaced, radially extending pivot shafts 68 rotatably supporting resilient rollers 70 bearing against an outer surface or periphery of first shaft 14. The elevating control housing 66 is vertically movably telescoped over the first shaft 14 vertically movable along the shaft 14 above the driven gear 55 and retained against rotation by a slotted tab 72 on the housing 66 vertically slidably receiving a vertically elongated retaining plate 74 extending inwardly from the cover 18. Also, the housing 66 adjustably supports the pivot shafts 68 pivotal about horizontal axes so that by pivoting the pivot shafts 68 relative to housing 66, consequent pivoting of the axes of the rollers 70 occurs and in this manner, the axes of rollers 70 may be pivoted between positions aligned with the axis of the first shaft 14 and positions angled in either direction relative to the axis of first shaft 14.

Thus, with the elevating control housing 66 being retained against rotation as described, and the first shaft 14 rotating within the housing 66 and relative thereto, pivotally adjusting the pivot shafts 68 to align the axes of the rollers 70 with the axis of the first shaft 14 will cause the rollers 70 to describe a circular line along the periphery of the first shaft 14, thereby maintaining the housing 66 vertically stationary. Pivoting of the pivot shafts 68 in either corresponding direction so as to angle the axes of the rollers 70 in either corresponding direction relative to alignment with the axis of the first shaft 14 and during rotation of the first shaft 14, will cause the rollers 70 to describe upwardly or downwardly angled helical paths around the periphery of the first shaft 14, dependent on the given direction of rotation of the shaft. This will cause upward or downward movement of the elevating control housing 66 in relation to and along the first shaft 14 and in relation to the cover 18, all for the purpose to be described hereinbelow.

Each of the rollers 70 is resiliently urged toward the periphery of the first shaft 14 by a spring 76 bearing against the outer end of the particular pivot shaft 68 with the compression of the spring, and therefore the resilient urging thereof, being adjustable through an adjusting screw 78 threadably engaged with the elevating control housing 66. The adjustment screws 78 extend through appropriately positioned slots 80 in the cover 18 for permitting vertical movement of the elevating control housing 66 relative to the cover 18 while still positioning the outer ends of screws 78 for adjustment outward of the cover 18. In this manner, the resilient urging of the rollers 70 against the periphery of the first shaft 14 may be maintained sufficient to provide the proper vertical urging of the elevating control housing 66 for the purpose intended and to be hereinafter discussed.

A pivot control pin 82 is secured to each of the pivot shafts 68 projecting downwardly therefrom through elongated slots 84 in the elevating control housing 66 and through connection openings 86 in pivot control plate 88. The pivot control plate 88 is rotatably mounted on the elevating control housing 66 underlying the pivot shafts 68 and the rollers 70, and the plate 88 is formed with a forked projection 90 extending beyond one side of the elevating control housing 66. The connections between the pivot control pins 82 and the pivot shafts 68, as well as between the pivot control pins 82 and the pivot control plate 88, are all arranged such that in any given position of the plate 88 as a result of limited rotation relative to the elevating control housing 66, will position each of the rollers 70 so that each of the axes thereof will be in the exact same angular relationship with the axis of the first shaft 14, thereby uniformly positioning the rollers 70 relative to the first shaft 14 and permitting uniform adjustment of the rollers 70 through limited rotation of the pivot control plate 88 relative to the elevating control housing 66.

Spaced below the pivot control plate 88, the elevating control housing 66 encloses an elevating control disc 92 which is annular in configuration for surrounding the first shaft 14, being vertically slidable relative thereto with the elevating control housing 66 and being rotatable within the housing 66. A vertically extending, rigid, elevating control rod 94 is positioned within the first shaft 14 outward of the second shaft 16 and has an L-shaped lower end portion 96 projecting outwardly through a vertically elongated slot 98 in the first shaft 14 for radial engagement in the elevating control disc 92. An upper end portion 100 of the elevating control rod 94 is inverted L-shaped in configuration extending outwardly through a vertically elongated slot 102 of the first shaft 14 and is radially engaged with a lower end of a connecting plate 104, the upper end of which is pivotally mounted on the support plate 56 spaced outwardly of the previously described pivotal connection of the support plate to the first shaft 14.

Thus, when the first shaft 14 is rotated through the first drive assembly 34, as hereinbefore described, to rotate the support plate 56 and thereby rotate the first airplane 64 through the connecting rod 62 around the axis of the first shaft 14, uniform angular displacement of the axes of the rollers 70 from alignment with the axis of the rotating first shaft 14 will cause the rollers 70 to uniformly climb or descend along the periphery of the first shaft 14. The uniform vertical movement of the rollers 70 along the periphery of the first shaft 14 will move the elevating control housing 66 vertically along the first shaft 14 and through the elevating control disc 92 and the elevating control rod 94, vertically pivoting the support plate 56 to progressively alter the altitude of the first airplane 64. In this manner, by the selective controlled positioning of the rollers 70 through the selected limited rotation of the pivot control plate 88 relative to the elevating control housing 66, the altitude of the first airplane 64 may be selectively controlled and varied during rotation of the first shaft 14, and at the same time, by selectively controlling and varying the rotational speed of the first shaft 14 through selective control of the first drive motor 42, not only is the speed of the first airplane 64 controlled and varied, but also the rate of altitude change of the first airplane 64 in view of the first altitude control mechanism 38 being directly actionable through the rotation of the first shaft 14, as described.

Both the altitude controlling limited rotation of the pivot control plate 88 for uniformly altering the positions of the rollers 70 and the speed controlling rotation of the first shaft 14 through the first drive motor 42 are remotely controlled through the first remote control panel 30, best seen in FIGS. 1 and 2. As shown, the first remote control panel 30 includes an upright, pivotal, altitude control lever 106 simulating the "joy stick" of an actual airplane, an upright, pivotal, power control lever 108 simulating the "power control" of an actual airplane, and an electric power switch 110 simulating the "ignition" of an actual airplane.

Figure 8:
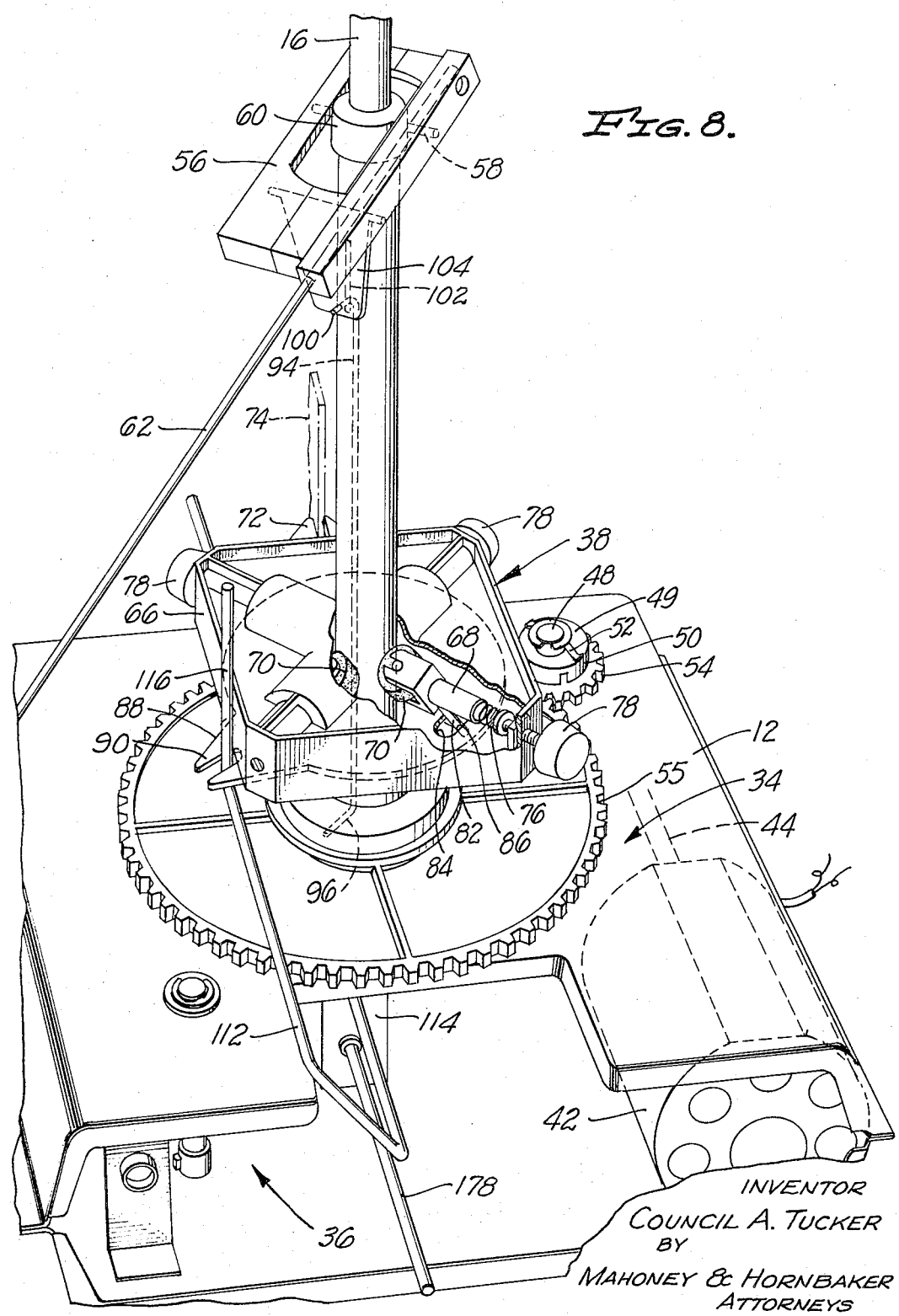
FIG. 8 is an enlarged, fragmentary, perspective view of the central portion of the flight simulator of FIG. 1 with portions of the cover removed to expose portions of the drive and altitude control for one of the airplanes.

As best seen in FIGS. 1 through 3, 5 and 8, the altitude control lever 106 is operably connected through a rigid, altitude control rod 112 to the pivot control plate 88. The altitude control rod 112 is connected to the altitude conrol lever 106 in a conventional manner whereby pivoting of the altitude control lever 106 will cause lengthwise inward and outward movement of the rod 112 toward and away from the drive and altitude control housing 12, with the altitude control rod 112 being horizontally received partially through the drive and altitude control housing 12, mounted slidable therein by appropriate brackets, such as a mounting bracket 114 (FIG. 8). Furthermore, the altitude control rod 112 within the drive and altitude control housing 12 is appropriately formed to clear other components and terminates in an upright inner end 116 engaged upwardly through the forked projection 90 of the pivot control plate 88 and horizontally slidably engaged with a vertical guide flange 118 extending downwardly from the cover 18 of the drive and altitude control housing 12.

The power control lever 108 is connected to a conventional rheostat (not shown) in a conventional manner for adjustment of the rheostat upon selective pivoting of the power control lever 108. Furthermore, an electric power line 120 is connected to an outside source of electricity and extends into the drive and altitude control housing 12, being operably connected therein to a first drive motor supply line 122. The supply line 122 transmits electric power outwardly to and through the power switch 110, through the rheostat controlled by the power control lever 108, and back to the first drive motor 42.

Thus, the operator of the first airplane 64 may be positioned at the first remote control panel 30 outside the flight path or circle of rotation of the first airplane 64. Actuation of the power switch 110 will begin minimum rotation of the first drive motor 42. Adjustment of the rotational speed of the first drive motor 42 through pivoting of the power control lever 108 will then permit increased and henceforth variable rotation or flight speed of the first airplane 64 through rotation of the first shaft 14 by the operable connection thereof through the first drive assembly 34 to the first drive motor 42 and the operable connection thereof through the support plate 56 and connecting rod 62 to the first airplane 64. At the same time, during the flight of the first airplane 64, the altitude thereof may be selectively changed by selective pivoting of the altitude control lever 106 causing movement of the altitude control rod 112 to vary the uniform positioning of the rollers 70 of the first altitude control mechanism 38 to thereby pivot the support plate 56 during rotation thereof through the connecting rod 62 for varying the altitude of the first airplane 64 upwardly and downwardly through the connecting rod 62.

The rate of altitude change of the first airplane 64, as hereinbefore pointed out, will be directly dependent on the combination of flight speed controlled through the power control lever 108 and the particular adjustment of the first altitude control mechanism 38 controlled through the altitude control lever 106. This is true in view of the fact that the upward and downward movement of the rollers 70 along the first shaft 14 is determined not only by the uniform adjustment of the rollers 70 providing angular displacement of the roller axes relative to alignment with the axis of the first shaft 14, but is also directly dependent on the speed of rotation of the first shaft 14. In this manner, the flight speed and altitude control of the first airplane 64 is closely simulated to that of an actual airplane and the operator is provided with "joy stick feel" through the altitude control lever 106.

The inner or second shaft 16 telescoped within the first shaft 14 is mounted with the lower end thereof extending below the lower end of the first shaft 14 within the drive and altitude control housing 12 and the lower end of the second shaft 16 is telescoped by a drive collar 124 secured thereto by pin 125 (FIG. 3) and thereby forming a part of the second shaft. Otherwise, the mounting, drive and control of the second airplane 126 is virtually the same as the first airplane 64, with the exception of the particular placing of the various components. As best seen in FIG. 3, the second drive assembly 36 is located at an opposite side of the drive and altitude control housing 12 from the first drive assembly 34, and the second altitude control mechanism 40 is located in the base 20 of the drive and altitude control housing 12.

Referring to FIGS. 3, 5 and 8, the second drive assembly 36 includes an electric, variable speed, second drive motor 128 having a shaft 130 operably connected through a worm 132, a worm gear 134, a ratchet clutch 136, a driving gear 138 and a driven gear 140 for rotating the second shaft 16 independent of the rotation of the first shaft 14. Driven gear 140 is also secured to the second shaft 16 through the pin 125 (FIG. 3) so that the second shaft, drive collar 124 and the driven gear are joined together as one rotatable assembly by the pin. A support plate 142 is vertically pivotally mounted at the upper end of the second shaft 16 rotatable with the second shaft and spaced above the upper end of the first shaft 14. A rigid connecting rod 144 is secured to the support plate 142 pivotal and rotatable therewith, and the second airplane 126 is secured to the outer end of the connecting rod 144 radially spaced from and rotatable in a flight path by the second shaft 16.

The second altitude control mechanism 40 for the second airplane 126 is arranged vertically reversed from the first altitude control mechanism 38, but otherwise is constructed and operates the same. The second altitude control mechanism 40 includes an elevating control housing 146 surrounding and vertically slidable along the drive collar 124 and therefore along the second shaft 16, with elevating control housing 146 uniformly pivotally supporting rollers 148 bearing against the outer periphery of the second shaft drive collar 124 through pivot shafts (not shown). The compressive force of abutment of the rollers 148 against the second shaft drive collar 124 is adjustable through adjustment screws 152, the outer ends of which project outwardly through vertically elongated slots 154 in the base 20, and the adjustment of the rollers 148 is controlled through pivot control pins 156 connected to the pivot shafts and projecting upwardly into engagement with a limited rotatable, pivot control plane 158 rotatably mounted on the elevating control housing 146 and having the forked projection 160.

Spaced above the pivot control plate 158, the elevating control housing 146 encloses a rotatable elevating control disc 162, which disc is vertically slidable relative to the second shaft drive collar 124 and receives a lower end portion 164 of an elevating control rod 166, and which rod lower end portion is retained in the disc by abutment with the previously described pin 125 (FIGS. 3 and 5). The elevating control rod 166 is a rigid rod extending within the second shaft 16 vertically movable relative to the second shaft, and a rod upper end portion 168 is connected through a connecting plate 170 to the support plate 142 for pivotal movement of the support plate through the vertical movement of the elevating control rod 166, as determined by the vertical movement of the rollers 148 relative to the second shaft 16.

The second remote control panel 32 mounted at the opposite side of the landing strip 24 from the first remote control panel 30 includes upright, pivotal, altitude and power control levers 172 and 174, as well as power switch 176, for remotely controlling the altitude and flight speed of the second airplane 126 by a second operator at the second remote control panel 32. By selective pivoting of the power control lever 174, electric power to the second drive motor 128 is regulated by a rheostat (not shown) within the panel 32 through a second drive motor supply line (not shown) for regulating the rotational speed of the second shaft 16 and thereby the flight speed of the second airplane 126. Also, selective pivoting of the altitude control lever 172 operably connected through an altitude control rod 178 extending into the drive and altitude control housing 12 and having an inner end 180 engaged in the forked projection 160 of the pivot control plate 158 causes uniform movement of rollers 148, displacing the axes thereof angularly relative to the axis of the second shaft 16 and thereby varying the altitude of the second airplane 126 through vertical movement of the elevating control housing 146 and pivoting of the support plate 142.

Thus, with each of the first and second airplanes 64 and 126, rotational drive for rotating the airplanes is provided through the shafts 14 and 16, while at the same time, the altitude control mechanisms 38 and 40 acting directly through and by the shaft rotation controls the altitude and the change in altitude of the airplanes. The altitude change is directly dependent on the combination of both shaft speed of rotation and the adjustment of the elevating means incorporated in the altitude control mechanisms so that for any given elevating means adjustment to either increase or decrease the altitude of the particular airplane, an increase in the shaft speed of rotation will directly effect and increase the rate of altitude increase of the particular airplane. Likewise, for any given speed of shaft rotation, an adjustment of a particular elevating means for one of the airplanes to increase or decrease the angle establishing the angular relationship between the axes of the associated roller means and axis of the particular shaft, will increase or decrease the rate of altitude change despite the constant rotational speed.

It is pointed out that although in the particular embodiment of the flight simulator of the present invention illustrated and described herein the altitude control mechanisms 38 and 40 for the first and second airplanes 64 and 126 act directly on the first and second shafts 14 and 16, it is possible to accomplish virtually the same effect by mounting the roller means of the altitude control mechanisms acting against virtually any portions of the rotational drives to the shafts. For instance, in case of the first airplane 64, the mechanism could be arranged so that the rollers 70 act directly against and through the rotation of the idler shaft 48, or an extension of the idler shaft, with a connection from the rollers to the elevating control rod 94 so as to produce the same altitude control effect. For this reason, when it is stated in the present specification and the appended claims that the elevating means is operably connected to both the shaft and the support means for the particular airplane, it is intended that this relationship will be broadly construed and the action of the elevating means directly by and through the rotational drive of the shaft is intended to include the elevating means being actionable either directly against the shaft periphery, as well as at any rotational part in the drive to this shaft, all of which will be clearly apparent to those skilled in the art.

According to the present invention, therefore, a unique flight simulator is provided for model aircraft which provides the equivalent of the heretofore popular "U-control" limited to outdoor use, whereas that of the present invention is capable of indoor use and may be electrically driven. Furthermore, the present invention provides control for the aircraft which closely simulates the control of actual aircraft by incorporating altitude control for the aircraft dependent directly on flight speed. Also, the operator controlling the aircraft may be positioned remote from the flight path so that full assessment of the flight pattern may be obtained and the operator may remain stationary, rather than being required to rotate, as was necessary with the prior "U-control."

With the flight simulator embodiment illustrated and hereinbefore described, two aircraft are provided capable of flight over the same flight paths and patterns, with each aircraft being separately and independently controlled by a separate operator. Thus, competitive games and maneuvers may be indulged in by the operators for amusement and as an aid in developing co-ordination and skills.

For instance, with the two separately controlled airplanes, as illustrated, various combative competition simulating that of actual airplanes may be carried out such as a signal being provided on the tail of each airplane, with the other attempting to upset the signal. Still with the use of airplanes, various circuit maneuvers such as transfer of the figure of a man from the wing of one airplane to the landing gear of the other may be carried out, as well as simulated in-flight refueling, or airmail pickup from the flight strip, or simulated carrier landing wherein arresting wires may be provided on the flight strip for engagement by the airplanes during landing. Still further, by replacing the airplanes with models of space capsules, it is possible to perform space rendezvous maneuvers, or astronaut exchange maneuvers between the two capsule models.

As hereinbefore pointed out, full maneuverability of the aircraft, whether airplanes or otherwise, is provided both in flight speed and altitude control, with the flight speed and altitude control closely simulating that of actual aircraft. By providing flight speed control through the control of the speed of shaft rotation, and by providing the altitude control dependent directly on the combination of flight speed and altitude adjustment, the altitude change is a smooth spiraling motion of the aircraft during flight and at a rate directly dependent on flight speed and altitude setting so as to closely simulate the flight conditions of actual aircraft. Furthermore, by placing the altitude setting at the neutral position wherein the altitude remains constant, the aircraft will carry out a perfectly circular flight pattern, during which the flight speed may be varied as desired. Also, by providing the drive for the aircraft through a ratchet clutch arrangement, there is no danger of damage to the driving mechanisms as a result of one aircraft engaging the other and forcing an overdrive of that aircraft being engaged, since the ratchet clutch arrangement will permit this overdrive at a rotational speed greater than that normally being provided by the particular drive motor without damage to the drive motor.

I claim:

1. In a flight simulator, the combination of: a frame; a shaft rotatably mounted on said frame and extending upwardly therefrom; drive means operably connected for rotating said shaft; a model aircraft; support means operably connecting said aircraft to and spaced from said shaft for rotation of said aircraft by and with the rotation of said shaft; and elevating means operably connected to both said shaft and said support means actionable directly by and through said shaft rotational drive for controlling and selectively changing the altitude of said aircraft in rotation with said shaft, said elevating means including selectively adjustable means cooperative with said shaft and operably connected to said elevating means for adjusting said elevating means responsive to shaft rotation.

2. A flight simulator as defined in claim 1 in which said drive means is selectively adjustable variable speed drive means; and in which said elevating means includes means directly dependent on the combination of both shaft speed of rotation and elevating means adjustment throughout said adjustment range thereof for controlling the rate of altitude change of said aircraft during said aircraft rotation.

3. A flight simulator as defined in claim 1 in which said elevating means includes roller means peripherally engaging said shaft and rotatable through said shaft rotation, selectively adjustable roller mounting means mounting said roller means, the selective adjustment of said roller mounting means varying the angular relationship between the axis of said roller means and the axis of said shaft for varying vertical urging of said roller means upwardly and downwardly along said shaft during said shaft rotation, means operably connecting said roller mounting means to said frame for vertical movement along said shaft according to said roller means vertical movement, and means operably connecting said roller mounting means and said support means for controlling and changing said aircraft altitude as a direct result of said roller mounting means vertical movement.

4. A flight simulator as defined in claim 1 in which said elevating means includes a series of roller means peripherally engaging said shaft at circumferentially spaced locations and simultaneously rotatable through said shaft rotation, selectively adjustable roller mounting means mounting said roller means, the selective adjustment of said roller mounting means simultaneously and uniformly varying the angular relationship between the axes of said roller means and the axis of said shaft for varying vertical urging of said roller means upwardly and downwardly along said shaft during said shaft rotation, means operably connecting said roller mounting means to said frame for vertical movement along said shaft according to said roller means vertical movement, and means operably connecting said roller mounting means and said support means for controlling and changing said aircraft altitude as a direct result of said roller mounting means vertical movement.

5. A flight simulator as defined in claim 1 in which said elevating means includes a series of roller means peripherally engaging said shaft and rotatable through said shaft rotation, a series of selectively adjustable pivot means mounting said roller means, a selectively adjustable elevating control, means operably connecting said elevating control and said pivot means for selective simultaneous and uniform adjustment of said pivot means upon selective adjustment of said elevating control to simultaneously and uniformly vary the angular relationship between the axes of said roller means and the axis of said shaft to vary vertical urging of said roller means upwardly and downwardly along said shaft during said shaft rotation, means operably connecting said pivot means to said frame for vertical movement along said shaft according to said roller means vertical movement, and means operably connecting said pivot means and said support means for controlling and changing said aircraft altitude as a direct result of said pivot means vertical movement.

6. A flight simulator as defined in claim 1 in which said support means includes a support plate vertically pivotally connected to said shaft and rotatable by said shaft, a rigid member secured to said support plate and to said aircraft; and in which said elevating means includes frame means vertically movable along said shaft, means directly actionable by and through said shaft rotation for controlling said frame means vertical movement, means operably connecting said frame means and said support plate for translating vertical movement of said frame means into pivotal movement of said support plate.

7. A flight simulator as defined in claim 1 in which said support means includes a support plate vertically pivotally connected to said shaft and rotatable by said shaft; a rigid member secured to said support plate and to said aircraft; and in which said elevating means includes a roller means peripherally engaging said shaft and rotatable through said shaft rotation, selectively adjustable roller mounting means mounting said roller means, the selective adjustment of said roller mounting means varying the angular relationship between the axis of said roller means and the axis of said shaft for varying vertical urging of said roller means upwardly and downwardly along said shaft during said shaft rotation, means operably connecting said roller mounting means to said frame for vertical movement along said shaft according to said roller means vertical movement, and means operably connecting said roller mounting means and said support plate for translating vertical movement of said roller mounting means into pivotal movement of said support plate.

8. A flight simulator as defined in claim 1 in which said elevating means includes roller means peripherally engaging said shaft and rotatable through said shaft rotation, selectively adjustable roller mounting means mounting said roller means, the selective adjustment of said roller mounting means varying the angular relationship between the axis of said roller means and the axis of said shaft for varying vertical urging of said roller means upwardly and downwardly along said shaft during said shaft rotation, means operably connecting said roller mounting means to said frame for vertical movement along said shaft according to said roller means vertical movement, and means operably connecting said roller mounting means and said support means for controlling and changing said aircraft altitude as a direct result of said roller mounting means vertical movement; and in which said drive means is selectively adjustable variable speed drive means for rotating said shaft at selectively variable speeds, the rate of altitude change of said aircraft being dependent on the combination of said selected shaft speeds and said adjustment of said roller mounting means.

9. A flight simulator as defined in claim 1 in which said support means includes a support plate vertically pivotally connected to said shaft and rotatable by said shaft, a rigid member secured to said support plate and to said aircraft; in which said elevating means includes roller means peripherally engaging said shaft and rotatable through said shaft rotation, selectively adjustable roller mounting means mounting said roller means, the selective adjustment of said roller mounting means varying the angular relationship between the axis of said roller means and the axis of said shaft for varying vertical urging of said roller means upwardly and downwardly along said shaft during said shaft rotation, means operably connecting said roller mounting means to said frame for vertical movement along said shaft according to said roller means vertical movement, and means operably connecting said roller mounting means and said support plate for translating vertical movement of said roller mounting means into pivotal movement of said support plate; and in which said drive means includes selectively adjustable variable speed drive means for rotating said shaft at selectively variable speeds, the rate of altitude change of said aircraft being dependent on the combination of said selected shaft speeds and said adjustment of said roller mounting means.

10. A flight simulator as defined in claim 1 in which said support means includes a support plate vertically pivotally connected to said shaft and rotatable by said shaft, a rigid member secured to said support plate and to said aircraft; in which said elevating means includes a series of roller means peripherally engaging said shaft at circumferentially spaced locations and simultaneously rotatable through said shaft rotation, selectively adjustable roller mounting means mounting said roller means, the selective adjustment of said roller mounting means simultaneously and uniformly varying the angular relationship between the axes of said roller means and the axis of said shaft for varying vertical urging of said roller means upwardly and downwardly along said shaft during said shaft rotation, means operably connecting said roller mounting means to said frame for vertical movement along said shaft according to said roller means vertical movement, means operably connecting said roller mounting means and said support means support plate for translating vertical movement of said roller mounting means into pivotal movement of said support plate; and in which said drive means is selectively adjustable variable speed drive means for rotating said shaft at selectively variable speeds, the rate of altitude change of said aircraft being dependent on the combination of said selected shaft speeds and said adjustment of said roller mounting means.

11. A flight simulator as defined in claim 1 in which said drive means is selectively adjustable variable speed drive means; in which said elevating means includes means directly dependent on the combination of both shaft speed of rotation and elevating means adjustment throughout said adjustment range thereof for controlling the rate of altitude change of said aircraft during said aircraft rotation; and in which remote control means is operably connected to said drive means and said elevating means for selectively adjusting said drive means and elevating means at a location remote therefrom.

12. A flight simulator as defined in claim 1 in which said support means includes a support plate vertically pivotally connected to said shaft and rotatable by said shaft, a rigid member secured to said support plate and to said aircraft; in which said elevating means includes a series of roller means peripherally engaging said shaft at circumferentially spaced locations and simultaneously rotatable through said shaft rotation, selectively adjustable roller mounting means mounting said roller means, the selective adjustment of said roller mounting means simultaneously and uniformly varying the angular relationship between the axes of said roller means and the axis of said shaft for varying vertical urging of said roller means upwardly and downwardly along said shaft during said shaft rotation, means operably connecting said roller mounting means to said frame for vertical movement along said shaft according to said roller means vertical movement, means operably connecting said roller mounting means and said support means support plate for translating vertical movement of said roller mounting means into pivotal movement of said support plate; in which said drive means is selectively adjustable variable speed drive means for rotating said shaft at selectively variable speeds, the rate of altitude change of said aircraft being dependent on the combination of said selected shaft speeds and said adjustment of said roller mounting means; and in which remote control means is operably connected to said drive means and said roller mounting means for selectively adjusting said drive means and roller mounting means at a location remote therefrom.

13. In a flight simulator, the combination of: a frame; a first shaft rotatably mounted on said frame and extending upwardly therefrom; a second shaft rotatably mounted on said frame telescoped within and extending above said first shaft and rotatable independent of said first shaft; first drive means rotating said first shaft; second drive means rotating said second shaft; first and second model aircraft; first support means operably connecting said first aircraft radially spaced from said first shaft for rotation of said first aircraft by and with said first shaft; second support means operably connecting said second aircraft radially spaced from said second shaft for rotation of said second aircraft by and with said second shaft; selectively adjustable first elevating means operably connected to both said first shaft and first support means and actionable directly by and through said first shaft rotational drive for controlling and selectively changing the altitude of said first aircraft during rotation thereof; and selectively adjustable second elevating means operably connected to both said second shaft and second support means and actionable directly by and through said second shaft rotational drive for controlling and selectively changing the altitude of said second aircraft during rotation thereof.

14. A flight simulator as defined in claim 13 in which each of said first and second drive means is selectively adjustable variable speed drive means; and in which each of said first and second elevating means includes means directly dependent on the combination of both speed of rotation of the associated shaft and elevating means adjustment for controlling the rate of altitude change of the associated aircraft during said aircraft rotation.

15. A flight simulator as defined in claim 13 in which each of said first and second elevating means includes roller means peripherally engaging the respective shaft and rotatable through said respective shaft rotation, selectively adjustable roller mounting means mounting said roller means, the selective adjustment of said roller mounting means varying the angular relationship between the axes of said roller means and the axis of said respective shaft for varying vertical urging of said roller means upwardly and downwardly along said respective shaft during said shaft rotation, means operably connecting said roller mounting means to said frame for vertical movement along said respective shaft according to said roller means vertical movement, and means operably connecting said roller mounting means and the associated support means for controlling and changing the altitude of the associated aircraft as a direct result of said roller mounting means vertical movement.

16. A flight simulator as defined in claim 13 in which each of said first and second support means includes a rigid support member connected to the associated shaft for vertical pivotal movement relative thereto, said support member supporting the associated aircraft on and rotatable by the associated shaft; and in which each of said first and second elevating means is operably connected to said support member of the associated support means for controlling vertical pivoting of said support member to control the altitude of the associated aircraft.

17. A flight simulator as defined in claim 13 in which said first drive means includes a first selectively adjustable variable speed drive motor; in which said second drive means includes a second selectively adjustable variable speed drive motor; in which first clutch means is operably connected between said first aircraft and said first drive motor for permitting forced rotation of said first aircraft at a speed different than the normal rotational speed by said first drive motor; and in which second clutch means is operably connected between said second aircraft and said second drive means for permitting forced rotation of said second aircraft at a speed different than the normal rotational speed by said second drive motor.

18. A flight simulator as defined in claim 13 in which said first drive means includes a first selectively adjustable variable speed drive motor; in which said second drive means includes a second selectively adjustable variable speed drive motor; in which first ratchet clutch means is operably connected between said first drive motor and said first shaft permitting forced rotation of said first aircraft at a rotational speed faster than the normal adjusted driving speed by said first drive motor; and in which second ratchet clutch means is operably connected between said second drive motor and said second shaft for permitting forced rotation of said second aircraft at a rotational speed faster than the normal adjusted driving speed by said second drive motor.

19. A flight simulator as defined in claim 13 in which each of said first and second drive means includes a selectively adjustable variable speed drive motor; in which first and second clutch means are operably connected between the respective aircraft and drive motor for permitting forced rotation of said aircraft at a speed different than the normal rotational speed by said drive motor; and in which said first and second elevating means each includes means directly dependent on the combination of the speed of rotation of the respective shaft and elevating means adjustment for controlling the rate of altitude change of the respective aircraft during said aircraft rotation.

20. A flight simulator as defined in claim 13 in which each of said first and second drive means includes a selectively adjustable variable speed drive motor; in which first and second clutch means are operably connected between the associated aircraft and drive motor for permitting forced rotation of said aircraft at a speed different than the normal rotational speed by said drive motor; and in which each of said first and second elevating means includes roller means peripherally engaging the associated shaft and rotatable through the rotation of the associated shaft, selectively adjustable roller mounting means mounting said roller means, the selective adjustment of said roller mounting means varying the angular relationship between the axes of said roller means and the axis of the associated shaft for varying vertical urging of said roller means upwardly and downwardly along said shaft during said shaft rotation, means operably connecting said roller mounting means to said frame for vertical movement along the associated shaft according to said roller means vertical movement, means operably connecting said roller mounting means and the associated support means for controlling and changing the altitude of the associated aircraft as a direct result of said roller mounting means vertical movement, the rate of altitude change of the associated aircraft being dependent on the selected speed of the associated shaft and said adjustment of said roller mounting means.

21. A flight simulator as defined in claim 13 in which said first and second drive means each includes a selectively adjustable variable speed drive motor; in which first and second clutch means are operably connected between the associated aircraft and drive motor for permitting forced rotation of said aircraft at a speed different than the normal rotational speed by said drive motor; in which each of said first and second support means includes a rigid support member connected to the associated shaft for vertical pivotal movement relative thereto, said support member supporting the associated aircraft on and rotatable by the associated shaft; and in which each of said first and second elevating means is operably connected to said support member of the associated support means for controlling vertical pivoting of said support member to control the altitude of the associated aircraft.

22. A flight simulator as defined in claim 13 in which each of said first and second drive means is selectively adjustable variable speed drive means; in which each of said first and second elevating means includes means directly dependent on the combination of the speed of rotation of the associated shaft and elevating means adjustment for controlling the rate of altitude change of the associated aircraft during said aircraft rotation; and in which remote control means is operably connected to each of said drive means and each of said elevating means for selectively adjusting said drive means and said elevating means at a location remote therefrom.

23. A flight simulator as defined in claim 13 in which said first and second drive means each includes a selectively adjustable variable speed drive motor; in which first and second clutch means are operably connected between the associated aircraft and drive motor for permitting forced rotation of said aircraft at a speed different than the normal rotational speed by said drive motor; in which each of said first and second support means includes a rigid support member connected to the associated shaft for vertical pivotal movement relative thereto, said support member supporting the associated aircraft on and rotatable by the associated shaft; in which each of said first and second elevating means is operably connected to said support member of the associated support means for controlling vertical pivoting of said support member to control the altitude of the associated aircraft; and in which remote control means is operably connected to each of said drive motors and each of said elevating means for selectively varying the adjustment of said drive motor and elevating means at a location remote therefrom.

24. In a flight simulator, the combination of: a frame; first and second telescoped shafts independently rotatable on said frame and extending upwardly therefrom, the inner of said shafts extending above the outer of said shafts; first selectively adjustable variable speed drive means operably connected to said first shaft for rotating said first shaft; second selectively adjustable variable speed drive means operably connected to said second shaft for rotating said second shaft; first and second model aircraft; support means radially connecting said first aircraft to said first shaft and said second aircraft to said second shaft for rotation in simulated flight of said aircraft by and about said shafts and capable of interferring flight paths; first clutch means operably connected between said first drive means and said first aircraft for permitting forced rotation of said first aircraft at a speed different from the normal rotational speed through said first drive means; and second clutch means operably connected between said second drive means and said second aircraft for permitting forced rotation of said second aircraft at a speed different from the normal rotational speed through said second drive means.

25. A flight simulator as defined in claim 24 in which said first clutch means includes a ratchet clutch operably connected between said first drive means and said first shaft; and in which said second clutch means includes a ratchet clutch operably connected between said second drive means and said second shaft.

References Cited

UNITED STATES PATENTS

| | | | |
|---|---|---|---|
| 2,031,310 | 2/1936 | Hall | 35—12 |
| 2,510,169 | 6/1950 | Caler | 272—31 |

FOREIGN PATENTS

| | | |
|---|---|---|
| 1,107,938 | 1/1956 | France. |
| 534,891 | 6/1954 | Italy. |

EUGENE R. CAPOZIO, *Primary Examiner.*

R. WEIG, *Assistant Examiner.*